United States Patent [19]

Alston et al.

[11] Patent Number: 4,845,167

[45] Date of Patent: Jul. 4, 1989

[54] CONDENSATION POLYIMIDES CONTAINING 1,1,1-TRIARYL-2,2,2-TRIFLUOROETHANE STRUCTURES

[75] Inventors: William B. Alston, Medina, Ohio; Roy F. Gratz, Fredericksburg, Va.

[73] Assignee: The United States of America as represented by the Administrator of the National Aeronautics and Space Administration, Washington, D.C.

[21] Appl. No.: 924,470

[22] Filed: Oct. 29, 1986

[51] Int. Cl.$^4$ .............................................. C08G 73/10
[52] U.S. Cl. .................................. 528/353; 528/352; 528/229; 528/188
[58] Field of Search ............... 528/353, 352, 229, 188

[56] References Cited

U.S. PATENT DOCUMENTS

| | | | |
|---|---|---|---|
| 3,310,573 | 3/1967 | Coe | 549/241 |
| 3,356,648 | 12/1967 | Rogers | 528/353 |
| 3,959,350 | 5/1976 | Rogers | 528/185 |
| 4,111,906 | 9/1978 | Jones et al. | 528/229 |
| 4,535,101 | 8/1985 | Lee et al. | 521/189 |
| 4,542,257 | 9/1985 | Fraser et al. | 528/353 |
| 4,569,988 | 2/1986 | Scola et al. | 528/353 |

Primary Examiner—John Kight
Assistant Examiner—M. L. Moore
Attorney, Agent, or Firm—James A. Mackin; Gene E. Shook; John R. Manning

[57] ABSTRACT

A condensation polyimide containing a 1,1,1-triaryl-2,2,2-trifluoroethane structure, other related condensation polyimides and process for their preparation, which comprises polymerization of a cyclic dianhydride with a diamine.

25 Claims, 1 Drawing Sheet

CONDENSATION POLYIMIDES CONTAINING 1,1,1-TRIARYL-2,2,2-TRIFLUOROETHANE STRUCTURES

ORIGIN OF THE INVENTION

This invention was made by Government employees and may be manufactured or used by or for the Government without the payment of any royalties thereon or therefor.

BACKGROUND OF THE INVENTION

1. Field of the Invention

The present invention relates to methods for the synthesis of condensation polyimides that contain a 1,1,1-triaryl-2,2,2-trifluoroethane structure, as well as other related condensation polyimides. The said condensation polyimides meet or exceed the performance characteristics required for high temperature resins and composites in present or future aeronautic requirements.

The utility of polyimides as a class of polymers is well-known. Polyimides, because of their low cost, excellent thermo-oxidative stability, chemical stability, and commercial availability, are in a class by themselves. They exhibit widespread applications, such as for films, coatings, moldings, adhesives, binder solutions and matrix resins. Extensive review articles and books, such as in Heat-Resistant Polymers, J. P. Critchley, et al, chapter 5, on Polyimides, (Plenum Press, 1983) described the many polyimides that have been prepared and indicate which compositions are successful commercial variants. In a class by themselves are the propylidene (6F) polyimides because of their superior thermal stability compared to non-fluorinated polyimides. The 6F containing polyimides have become the state-of-the-art in melt processable polyimide for moldings and matrix resin applications. This patent application is designed to show that the use of the new 1,1,1-triaryl-2,2,2-trifluoroethane (3F) containing polyimides possess all the desirable melt fusible-melt processable characteristics of 6F containing polyimides but in addition are more versatile than 6F containing polyimides because of the potentials described to introduce a variety of functional groups for the modification of polymer properties. In addition, the 6F containing polyimides have a very unique new application compared to non-6F polyimides. The use of 6F containing polyimides as film formers for protective coatings on solar cells was recently patented (U.S. Pat. No. 4,592,925 granted to Preston S. duPont and Normn Bilow of Hughes Aircraft Company) because the use of 6F connecting groups in polyimides was shown to provide almost transparent polyimide films, as reported in A. K. St.Clair, et al, NASA TM 87650 (December 1985). Because it was also noted in the Alston and Gratz work on 3F containing polyimides that the films were very light in color compared to the non-6F polyimides, then the 3F polyimides would also have applications as film forming resins for application where optical transparency is a desirable characteristic, e.g., solar cell coatings.

2. Description of the Prior Art

Presently one method of meeting these high temperature performance requirements has been through the use of commercially available thermo-oxidatively stable monomers/polymers based on a 2,2-diaryl-1,1,1,3,3,3-hexafluoro-isopropylidene structure (6F). A 1,1,1-triaryl-2,2,2-trifluoro-ethane structure (3F) is also known.

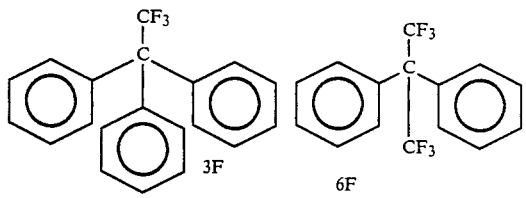

The synthesis of condensation polyimides based on similar 6F structures has been previously reported as follows: H. G. Gibbs, J. Applied Polymer Science, Applied Polymer Symposium, 35, 207 (1979); E. I. duPont, British Pat. No. 1,062,435 (Mar. 22, 1967).

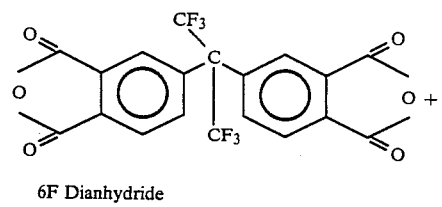

6F Dianhydride

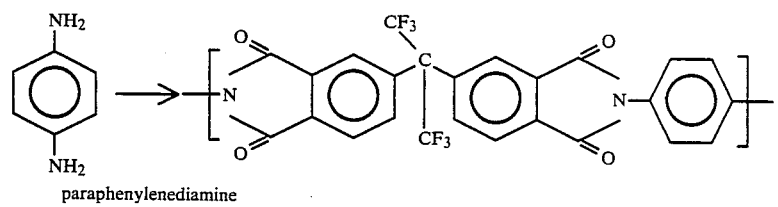

paraphenylenediamine

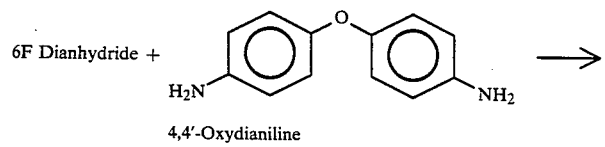

4,4′-Oxydianiline

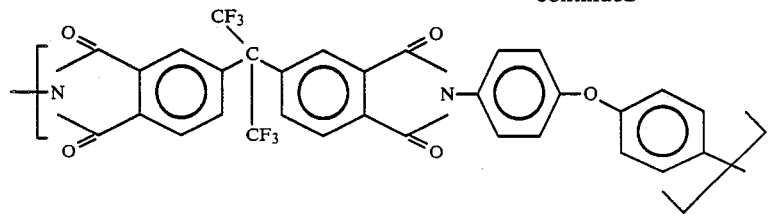

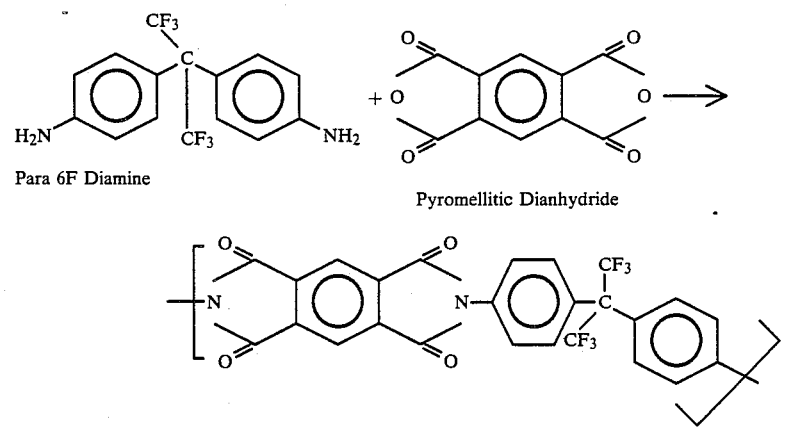

(Example I in British Patent 1,062,435)

The 6F dianhydride is presently used in commercially available resin products (called NR 150 resins) available from E. I. duPont, U.S. Pat. No. 3,310,573. The 6F diamine polymerized with pyromellitic dianhydride has been patented but not commercialized by E. I. duPont. A similar 6F diamine wih meta, rather than para substitution, has been recently synthesized, K. S. Y., Lau, et al, J. Polymer Science, 20, 2381–2393 (1982), and is available from American Hoechst in developmental quantities but reference does not exist to its use in polyimides. Nevertheless, during the course of this study, a new polymer of pyromellitic dianhydride/meta 6F diamine was prepared for comparison purposes to 3F containing polymers as shown below.

Pyromellitic Dianhydride +

The synthesis of similar diamines but based on a 3F structure through a different synthetic route has been reported, W. D. Kray and R. W. Rosser, J. Org. Chem., 42, 1186–1189 (1977). The purpose of this application is to disclose (or claim) new 3F containing high temperature resistant condensation polyimides and to demonstrate two methods of controlling the high glass transition temperature (Tg) of 3F diamine containing polymers. This is reported in FIGS. 6 and 7 of William B. Alston and Roy F. Gratz, NASA TM 87113, AVSCOM TR-85-C18. These polyimide polymers contain the 3F structure in both the diamine or dianhydride monomers. The 3F diamine synthesis is reported in W. D. Kray and R. W. Rosser, J. Org. Chem., 42, 1186–1189 (1977) while the 3F dianhydride synthesis is disclosed in U.S. Pat. No. 4,758,380.

This copending disclosure claims a variety of methods to effect additional functional group introduction, such as from during the initial monomer synthesis to during a later step in the monomer synthesis, to performing functional group changes on the final polymer structure. This U.S. Pat. No. 4,758,380 disclosure generally claims the polymerization to new 3F polyimides after the functional groups for modifying polymer properties are already within the monomer structures, but is not limited to introduction of functional groups prior to polymerization. Changes in functional groups may be effected once a functional group already exists within the 3F polymer. Thus, the utility of the 3F group is primarily because the 3F phenyl ring is a synthetic site which represents these 3F polymers as the next generation of more synthetically versatile polymers than with the state-of-the-art 6F polymers currently claimed in U.S. Pat. No. 4,592,925 as solar cell coatings or also as radiation resistant or radiation sensitive modified 6F polymers as patented in U.S. Pat. No. 4,416,973 by David L. Goff of E. I. duPont. An example is the use of substituted anilines to prepare alkyl substituted 3F containing diamines as outlined in U.S. Pat. No. 4,758,380 has expanded utility as potential photoresists advancing the technology of non-fluorinated photoresists described by J. Pfeifer and O. Rhode of Ciba-Geigy in "Direct Photoimaging of Fully Imidized Solvent Soluble Polyimides" in proceedings of 2nd International

SUMMARY OF THE INVENTION

Therefore it is an object of this invention to provide a process for preparing a condensation polyimide containing a 1,1-bis[4-(1,2-imide)aryl]-1-aryl-2,2,2-trifluoroethane structure which comprises polymerizing a cyclic dianhydride with a diamine.

A further object is to provide a process for preparing a condensation polyimide which comprises polymerizing

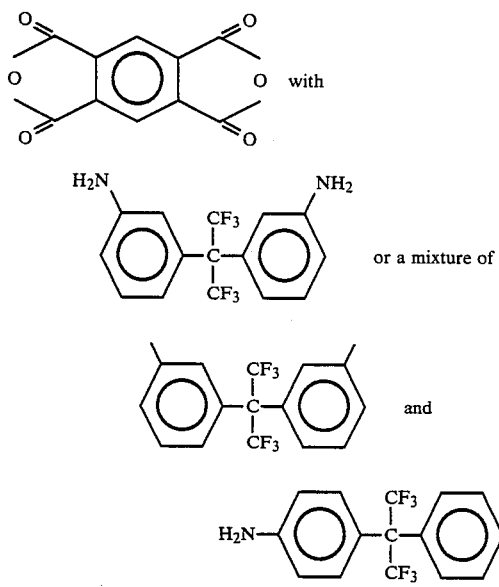

Yet further, we have discovered that the products resulting from each of the above methods are new.

Further objects of the invention will be apparent from the detailed description of the invention which follows.

DETAILED DESCRIPTION OF THE INVENTION AND PREFERRED EMBODIMENTS

Figure 1:
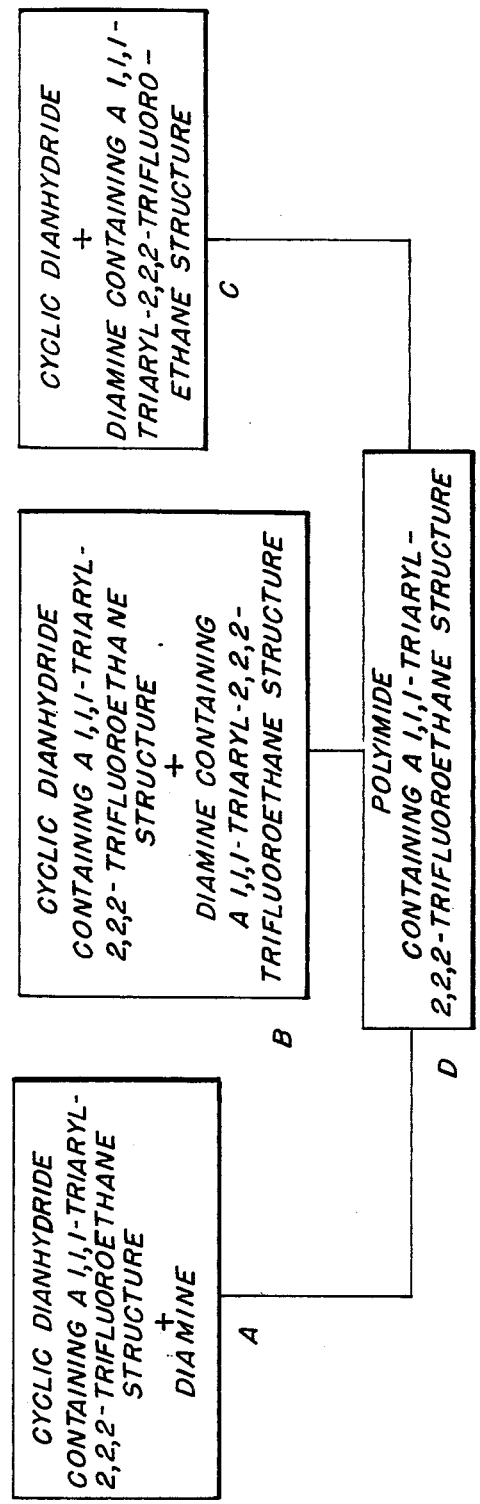

Applicants have discovered a novel process for polymerizing a cyclic dianhydride with a diamine which will result in the formation of a new condensation polyimide containing a 1,1-bis[4-(1,2-imide)-aryl]-1-aryl-2,2,2-tri-fluoroethane structure. A detailed description of the typical polymerization process is as follows: A polyimide containing the 1,1,1-triaryl-2,2,2-tri-fluoroethane structure in both one or none of the monomers is generally formed by reacting substantially equimolar amounts of the dianhydride and diamine monomers in a solvent suitable for both monomers. The solvents which can be used, but are not limited to, are, for example, tetrahydrofuran, N-methyl pyrrolidinone, N-methyl formamide, N,N-dimethylformamide, N,N-dimethylacetamide, dimethyl sulfoxide and mixtures thereof. The polymerization is generally done by dissolving the diamine monomer(s) in the selected solvent(s). The substantially equimolar amount of dianhydride monomer(s) is then added all at once to the diamine solution at 0° to 35° C., generally at room temperature (20°–25° C.) and more solvent(s) added, if needed, to dissolve the dianhydride(s) and to maintain a solid weight percent of 5 to 30%, generally 10 to 15 weight percent. The reaction vessel is flushed with an inert gas, generally nitrogen, and stirred for a minimum of 1 hour at room temperature to a minimum of 24 hours at 0° C. When completed, the polyamic acid solutions are stored in a freezer at −10° C. The thick viscous solutions can be cast as films or used to prepare polyamic acid molding powders by precipitation of the solution into ice water or used to prepare polyimide molding powders by thermal imidization or chemical imidization of the isolated polyamic acid powder, as described in Alston and Gratz, NASA TM 87113, AVSCOM TR 85-C-18. The thick viscous polyamic acid solutions when diluted to 0.5% w/v solids displayed inherent viscosities at 25° C. of between 0.1 and 1.5, but generally 0.4 to 0.9. Polyimide films are prepared by thermal treatment of the polyamic acid cast solution on the substrate to be coated for 1 to 3 hours at 250° C. to 500° C., but generally 300° to 350° C. The thermal treatment was generally done initially at 80°–100° C. under flowing nitrogen until an amic acid film (with excess solvent(s) evaporated) was obtained. Then imidization is done at the higher 250°–500° C. temperature range.

Suitable cyclic dianhydrides and mixtures thereof include those of the formulae

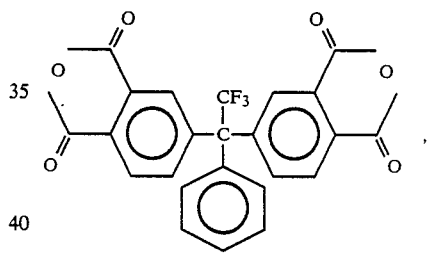

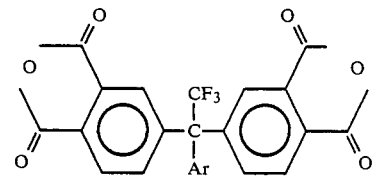

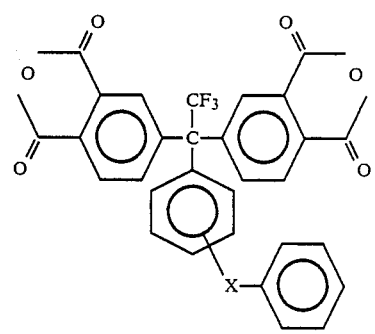

wherein Ar is a polycyclic aromatic hydrocarbon such as naphthalene, phenanthrene, anthracene, pyrene, etc. and X is O, S, $SO_2$, NH, PH, N$\phi$, P$\phi$, C=O, $CH_2$ or CH$\phi$

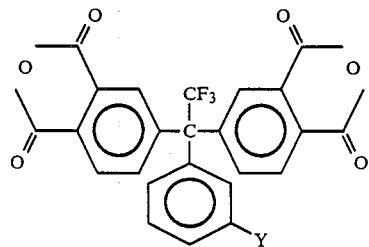

and Y is φ-O, φ-S, φ-SO₂, φ-PH, φ₂-P, φ₂N or NO₂,

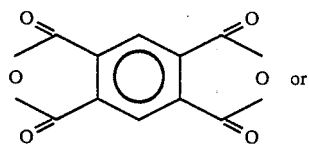 or

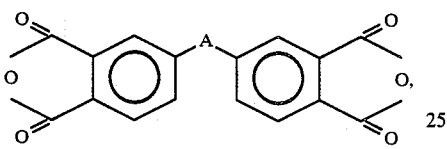

wherein A is O,

C(CF₃)₂ or C(CF₃)φ.

Although X and some Y may appear equivalent, the distinctions are (1) X may be meta or para while Y is always meta and (2) X is incorporated into the aryl trifluoromethyl ketone before formation of the 3F dianhydride or 3F diamine compounds while Y is nucleophilicly put on the 3F dianhydride or 3F diamine after their formation, as shown in U.S. Pat. No. 4,758,380.

Suitable diamines and mixtures thereof include those of the formulae

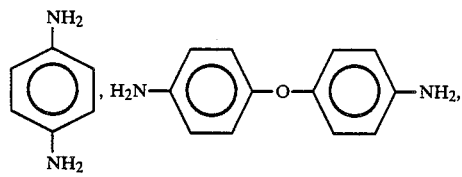

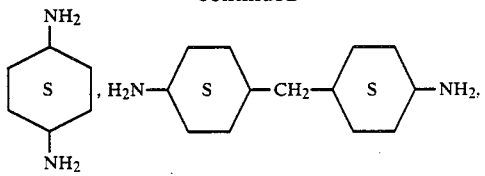

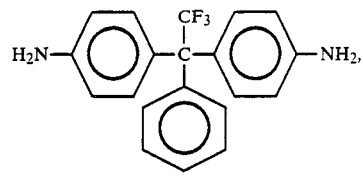

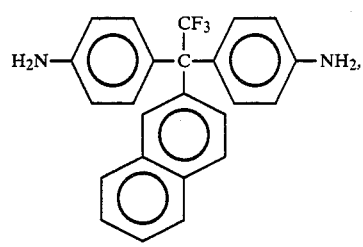

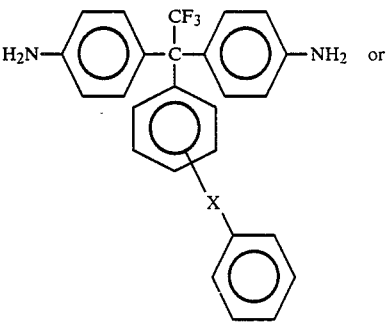

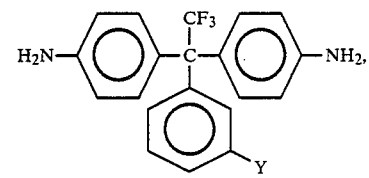

wherein X is O, S, SO₂, NH, PH, Nφ, Pφ, C=O, CH₂ or CHφ, and Y is φ-O, φ-S, φ-SO₂, φ-PH, φ₂P, φ₂N or NO₂.

These diamines are then polymerized with the 3F dianhydrides to prepare new 3F containing polyimides as illustrated below.

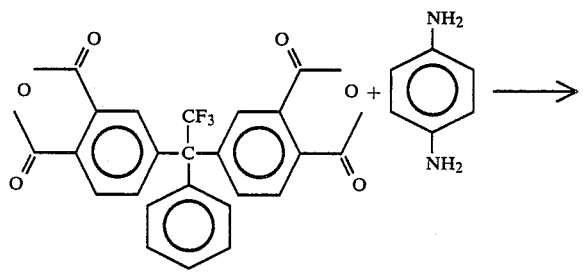

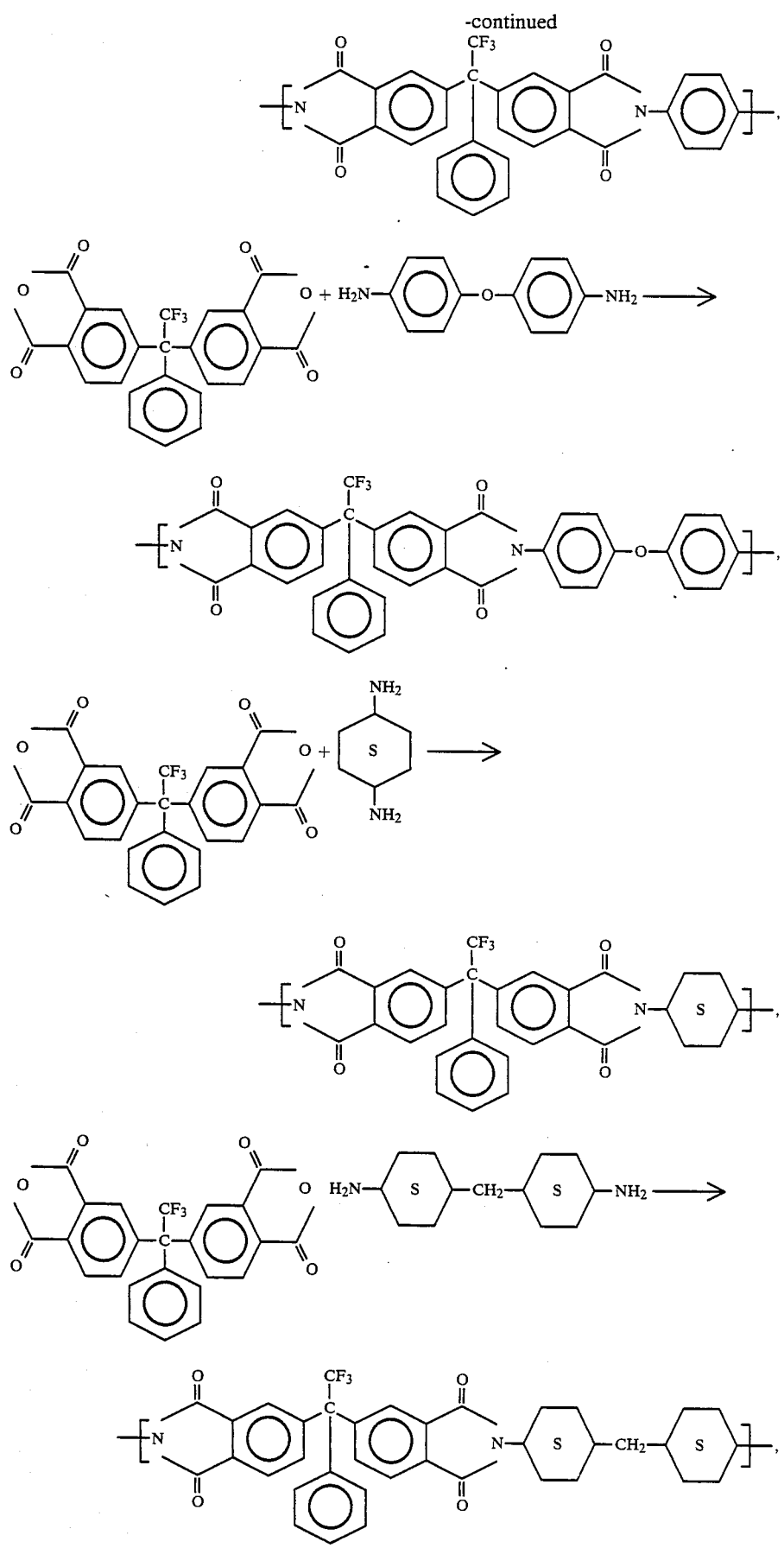

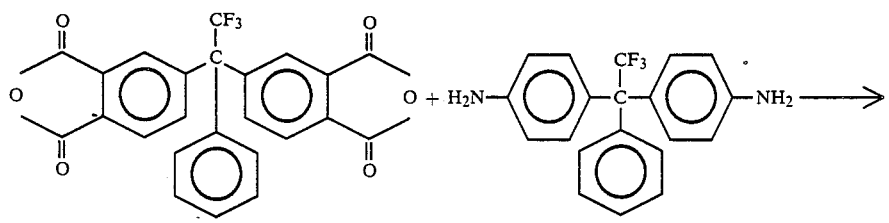
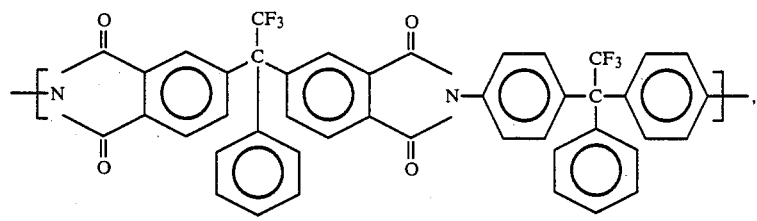
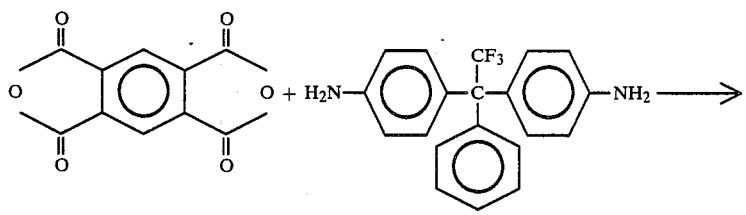
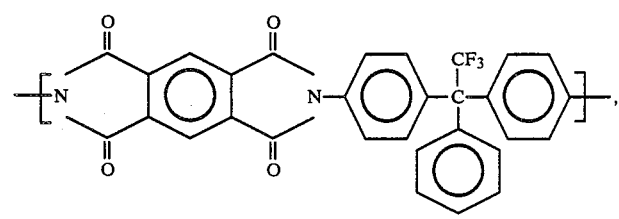
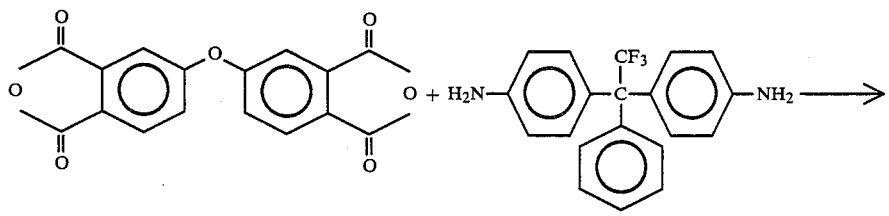
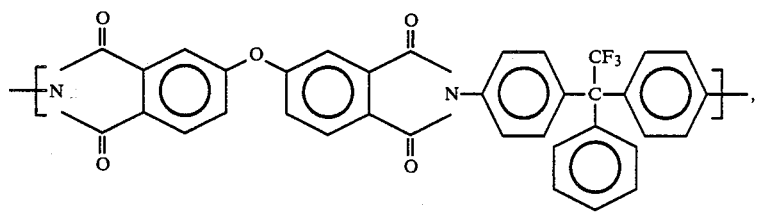
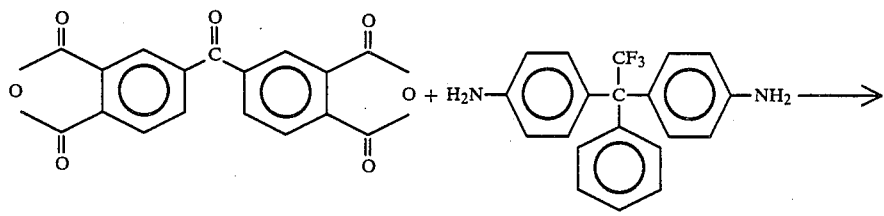

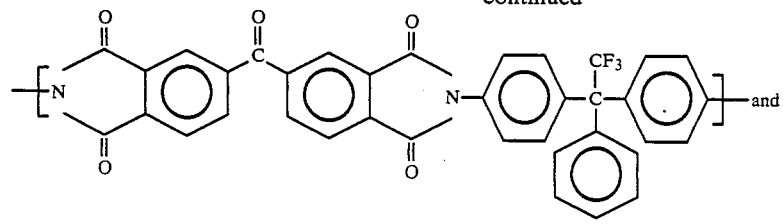

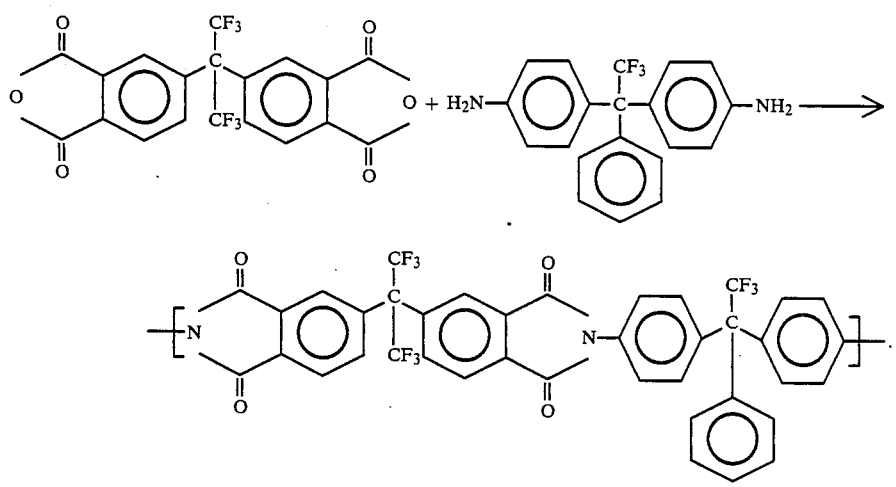

Other condensation polyimides which contain 1,1-bis[4-(1,2-imide)aryl]-1-aryl-2,2,2-trifluoroethane structures are those prepared by the process in which the cyclic dianhydride is a mixture of

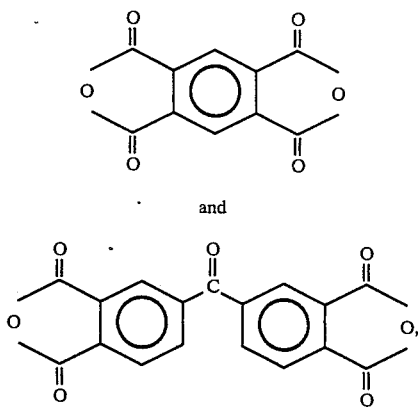

and the process in which the cyclic dianhydride is a mixture of

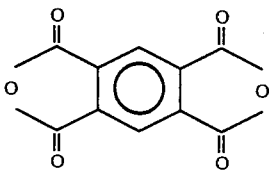

and

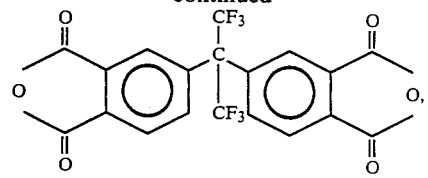

the process in which the cyclic dianhydride is a mixture of

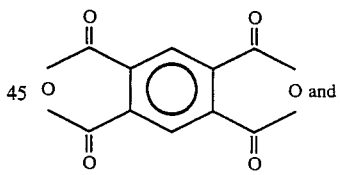

O and

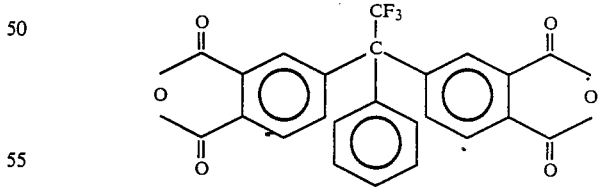

The process in which the cyclic dianhydride is

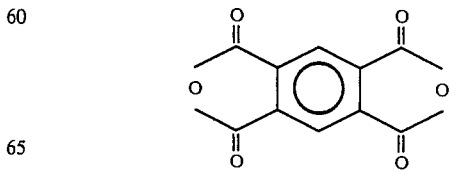

and the diamine is a mixture of

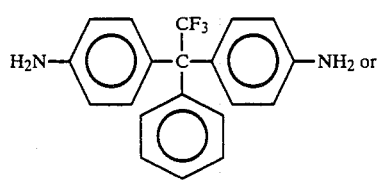

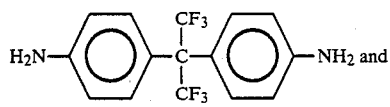

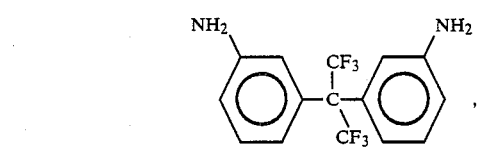

the process in which the cyclic dianhydride is

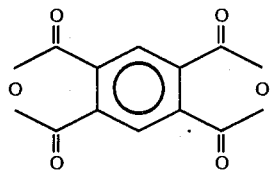

and the diamine is a mixture of

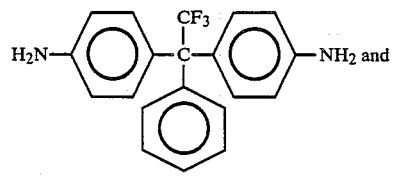

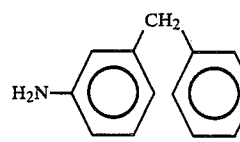

and the process in which the cyclic dianhydride is

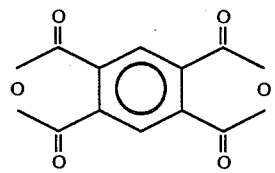

and the diamine is a mixture of

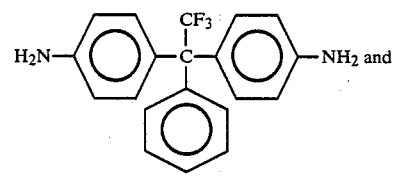

-continued

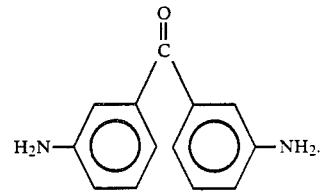

FIG. 1 illustrates the formation of the novel condensation polyimides containing a 1,1,1-triaryl-2,2,2-trifluoroethane structure.

Further, applicants have discovered yet another novel condensation polyimide which was prepared by polymerizing.

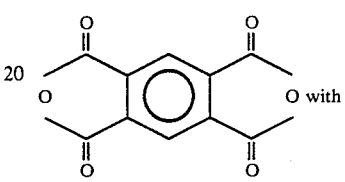 with

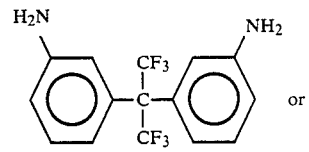 or a mixture of

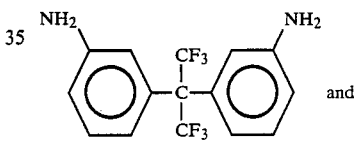 and

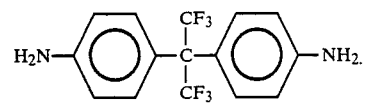.

Figure 2:
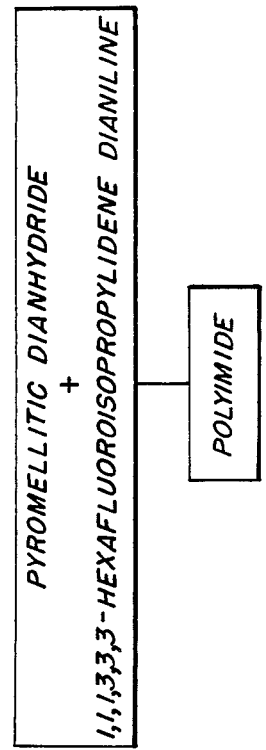

FIG. 2 illustrates the formation of the above novel condensation polyimides.

The following examples are intended to illustrate the invention and are not to be construed as limiting the invention thereto.

EXAMPLES

This invention is further illustrated by, but not limited to, the following examples.

EXAMPLE I

This Example I discloses the preparation of a new 3F containing polyimide and its casting into a film.

A 50 ml. erlenmeyer flask was dried at 80° C., cooled to room temperature in dry nitrogen and a magnetic stir bar was added to the flask. To the flask was then added 1.500 g (4.38 mmoles) of 1,1-bis(4-aminophenyl)-1-phenyl-2,2,2-tri-fluoroethane and 11 g. of N,N-dimethylacetamide (DMAc). After the diamine dissolved 0.956 g. (4.38 mmoles) of pyromellitic dianhydride was added along with 11 more grams of N,N-dimethylacetamide to maintain 10 weight percent solids. The diamine had been previously recrystallized from ethanol, the PMDA recrystallized from acetic anhydride and vacuum sublimed and the DMAc vacuum distilled from calcium hydride. The reactants were stirred until the monomers dissolved, flushed with nitrogen and sealed. After 1 hour at room temperature (~25° C.) the polyamic acid solution attained an inherent viscosity of 0.75 dl./g. at 0.5% w/v solids at 25° C. A 1.5 g portion of the polyamic acid solution was cast in a petri dish and heated at approximately 80° C. under a stream of nitrogen until the sample lost 83% of its weight as excess DMAc solvent evaporated. The remainder of the polyamic acid solution was stored in a freezer at −10° C. The polyamic acid film was thermally imidized by treatment under nitrogen for 1 hour at 340° C. with a 1 hour heatup to the 340° C. and a 1 hour cool down back to room temperature after the 340° C. imidization treatment. The polyimide film had lost 90.7% of its weight from the polyamic acid solution at this time, confirming the ~10% solids for polymerization reaction calculations. The glass transition temperature was ~360° C., corresponding closely to the 340° C. process temperature of the imidized film, as seen in FIGS. 5 and 6 of Alston and Gratz, NASA TM 87113 and AVSCOM TR-85-C-18.

EXAMPLE II

This Example II discloses the preparation of a new 3F containing polyimide:

Using the procedure of Example I, 2.575 g. (7.53 mmoles) of 1,1-bis(4-aminophenyl)-1-phenyl-2,2,2-trifluoroethane in 14 g. of N,N-dimethylacetamide (DMAc) was reacted with 2.425 g. (7.53 mmoles) of 3,3',4,4'-benzophenonetetracarboxylic dianhydride with 14 more grams of DMAc added to maintain 15 weight percent solids. Monomer and solvent purification was as in Example I, dianhydride purification was also by recrystallization from acetic anhydride followed by vacuum sublimation. After 1 hour under nitrogen atmosphere at room temperature, the polyamic acid DMAc solution attained an inherent viscosity of 0.87 dl./g. at 0.5% w/v solids at 25° C. Film preparation was as per Example I at 350° C. to provide a film of glass transition temperatures ~320° C. as shown in FIGS. 5 and 6 of Alston and Gratz, NASA TM 87113, AVSCOM TR-85-C-18.

EXAMPLE III

This Example III discloses the preparation of a new 3F containing polyimide.

Using the procedure of Example I, 2.176 grams (6.36 mmoles) of 1,1-bis(4-aminophenyl)-1-phenyl-2,2,2-trifluoroethane in 14 grams of N,N-dimethylacetamide (DMAc) was reacted with 2.824 grams (6.36 mmoles) of 4,4'-(hexafluoroisopropylidene)-bis(phthalic anhydride) with 14 more grams of DMAc added to maintain 15 weight percent solids. Monomer and solvent purification was as in Example I, dianhydride purification was also by recrystallization from acetic anhydride followed by vacuum sublimation. After 1 hour under nitrogen atmosphere at room temperature, the polymeric acid DMAc solution attained an inherent viscosity of 0.73 dl./g. at 0.5% w/v solids at 25° C. Film preparation was as per Example I at 350° C. to provide a film of glass transition temperatures ~320° C. as shown in FIGS. 5 and 6 of Alston and Gratz, NASA TM 87113, AVSCOM TR-85-C-18.

EXAMPLE IV

This Example IV discloses the preparation of a new 3F containing polyimide.

Using the procedure of Example I, 0.443 g (2.21 mmoles) of 4,4'-oxydianiline in 6.5 grams of N,N-dimethylacetamide (DMAc) was reacted with 1.000 grams (2.21 mmoles) of 4,4'-(trifluorophenylethylidene)-Bis-phthalic anhydride with 6.5 more grams of DMAc added to maintain 10 weight percent solids. Solvent purification was as in Example I, diamine purification by recrystallization from ethanol and dianhydride purification was by crystallization from acetic anhydride. After 1 hour under nitrogen atmosphere at room temperature, the polyamic acid DMAc solution attained an inherent viscosity of 0.21 dl./g. at 0.5% w/v solids at 25° C. Film preparation was as per Example I at 340° C. to provide a glass transition temperature ~290° C. as shown in FIG. 1 of Alston and Gratz, NASA TM 87113, AVSCOM TR-85-C-18.

EXAMPLE V

This Example V discloses the preparation of a new 3F containing polyimide.

Using the procedure of Example I, 0.757 g (2.21 mmoles) of 1,1-bis(4-aminophenyl)-1-phenyl-2,2,2-trifluoroethane in 7.9 grams of N,N-dimethylacetamide (DMAc) was reacted with 1.000 grams (2.21 mmoles) of 4,4'-(trifluorophenylethylidene)-Bis-phthalic anhydride with 7.9 more grams of DMAc added to maintain 10 weight percent solids. Monomer and solvent purification was as in Example I and IV. After 1 hour under nitrogen atmosphere at room temperature, the polyamic acid DMAc solution attained an inherent viscosity of 0.14 dl./g. at 0.5% w/v solids at 25° C. Film preparation was as per Example I at 340° C. to provide a glass transition temperature ~300° C. as shown in FIG. 1 of Alston and Gratz, NASA TM 87113, AVSCOM TR-85-C-18.

EXAMPLE VI

This Example VI discloses the preparation of a new 3F containing polyimide.

Using the procedure of Example I, 0.239 g (2.21 mmoles) of paraphenylenediamine in 5.6 grams of N,N-dimethylacetamide (DMAc) was reacted with 1.000 grams (2.21 mmoles) of 4,4'-(trifluorophenylethylidene)-Bis-phthalic anhydride with 5.6 more grams of DMAc added to maintain 10 weight percent solids. Monomer and solvent purification was as in Example IV. After 1 hour under nitrogen atmosphere at room temperature, the polyamic acid DMAc solution attained an inherent viscosity of 0.30 dl./g. at 0.5% w/v solids at 25° C. Film preparation was as per Example I at 340° C. to provide a glass transition temperature ~330° C. as shown in FIG. 1 of Alston and Gratz, NASA TM 87113, AVSCOM TR-85-C-18.

EXAMPLE VII

This Example VII discloses the preparation of a new 3F containing polyimide.

The range may be from 0 to 100% of one dianhydride, with 100 to 0% for the other dianhydride. A 50/50 equimolar amount of each is illustrated below.

Using the procedure of Example I, 0.535 g (15.6 mmoles) of 1,1-bis(4-aminophenyl)-1-phenyl-2,2,2-trifluoroethane in 2.7 grams of N,N-dimethylacetamide (DMAc) was reacted with 0.171 grams (7.8 mmoles) of pyromellitic dianhydride and 0.252 grams (7.8 mmoles) of 3,3',4,4'-benzophenonetetracarboxylic dianhydride, both together in another 2.7 grams DMAc to maintain 15 weight percent solids. Monomer and solvent purification was as in Example I and II. After 2 hours under nitrogen atmosphere at room temperature, the polyamic acid DMAc solution attained an inherent viscosity of 0.45 dl./g. at 0.5% w/v solids at 25° C. Film preparation was as per Example I at 350° C. to provide a glass transition temperature ~345° C. as shown in FIG. 6 of Alston and Gratz, NASA TM 87113, AVSCOM TR-85-C-18.

EXAMPLE VIII

This Example VIII discloses the preparation of a new 3F containing polyimide.

The range may be from 0 to 100% of one dianhydride, with 100 to 0% for the other dianhydride. A 50/50 equimolar amount of each is illustrated below.

Using the procedure of Example I, 0.898 g (26.2 mmoles) of 1,1-bis(4-aminophenyl)-1-phenyl-2,2,2-trifluoroethane in 5.0 grams of N,N-dimethylacetamide (DMAc) was reacted with 0.582 grams (1.31 mmoles) of pyromellitic dianhydride and 0.582 grams (1.31 mmoles) of 4,4'-(hexafluoroisopropylidene)-bis-phthalic dianhydride both together in another 5.0 grams DMAc to maintain 15 weight percent solids. Monomer and solvent purification was as in Example I and III. After 2 hours under nitrogen atmosphere at room temperature, the polyamic acid DMAc solution attained an inherent viscosity of 0.79 dl./g. at 0.5% w/v solids at 25° C. Film preparation was as per Example I at 350° C. to provide a glass transition temperature ~360° C. as shown in FIG. 6 of Alston and Gratz, NASA TM 87113, AVSCOM TR-85-C-18.

EXAMPLE IX

This Example IX discloses the preparation of a new 3F containing polyimide.

The range may be from 0 to 100% of the 3F containing diamine, with 100 to 0% of the 6F containing diamine. A 50/50 equimolar amount of each is illustrated below.

Using the procedure of Example I, 0.368 g (1.1 mmoles) of 2,2-bis(3-aminophenyl)-1,1,1,3,3,3-hexafluoroisopropylidene(M,M'-6F diamine) and 0.377 grams (1.1 mmoles) of 1,1-bis-(4-aminophenyl)-1-phenyl-2,2,2-trifluoroethane both together in 3.5 grams of N,N-dimethylacetamide (DMAc) was reacted with 0.480 grams (2.2 mmoles) of pyromellitic dianhydride in another 3.5 grams of DMAc to maintain 15 weight percent solids. Monomer and solvent purification was as in Example I. M,M'-6F diamine purification was by crystallization from heptane. After 2 hours under nitrogen atmosphere at room temperature, the polyamic acid DMAc solution attained an inherent viscosity of 0.42 dl./g. at 0.5% w/v solids at 25° C. Film preparation was as per Example I at 350° C. to provide a glass transition temperature ~335° C. as shown in FIG. 7 of Alston and Gratz, NASA TM 87113, AVSCOM TR-85-C-18.

EXAMPLE X

This Example X discloses the preparation of a composition range of new 6F containing polyimides.

The range may be from 0 up to but not including 100% of the para, para-6F diamine with 100 down to, but not including 0% of the meta, meta-6F diamine. A 50/50 equimolar amount of each is illustrated below.

Using the procedure of Example I, 0.368 g (1.1 mmoles) of 2,2-bis(3-aminophenyl)-1,1,1,3,3,3-hexafluoroisopropylidene(M,M'-6F diamine) and 0.368 grams (1.1 mmoles) of 2,2-bis(-4-aminophenyl)-1,1,1,3,3,3-hexafluoroisopropylidene (p,p'-6F diamine), both together in 3.5 grams of N,N-dimethylacetamide (DMAc) was reacted with 0.480 grams (2.2 mmoles) of pyromellitic dianhydride in another 3.5 grams of DMAc to maintain 15 weight percent solids. Monomer and solvent purification was as in Example I and IX, p,p'-6F diamine purification was by crystallization from ethanol. After 2 hours under nitrogen atmosphere at room temperature, the polyamic acid DMAc solution attained an inherent viscosity of 0.35 dl./g. at 0.5% w/v solids at 25° C. Film preparation was as per Example I at 350° C. to provide a glass transition temperature ~340° C. as shown in FIG. 7 of Alston and Gratz, NASA TM 87113, AVSCOM TR-85-C-18.

EXAMPLE XI

This Example XI discloses the preparation of a new 6F containing polyimide.

Using the procedure of Example I, 0.735 g (2.2 mmoles) of 2,2-bis(3-aminophenyl)-1,1,1,3,3,3-hexafluoroisopropylidene in 3.5 grams of N,N-dimethylacetamide (DMAc) was reacted with 0.480 grams (2.2 mmoles) pyromellitic dianhydride in another 3.5 grams of DMAc to maintain 15 weight percent solids. Monomer and solvent purification was as in Example I and IX. After 2 hours under nitrogen atmosphere at room temperature, the polyamic acid DMAc solution attained an inherent viscosity of 0.38 dl./g. at 0.5% w/v solids at 25° C. Film preparation was as per Example I at 350° C. to provide a glass transition temperature ~290° C. as shown in FIG. 7 of Alston and Gratz, NASA TM 87113, AVSCOM TR-85-C-18.

What is claimed is:

1. A condensation polyimide containing a 1,1,-bis[4-(1,2,-imide)aryl]-1-aryl-2,2,2-trifluoroethane structure comprising a polymerized mixture of a cyclic dianhydride and a diamine, either the dianhydride, the diamine or both containing 3F structures, the final polyimide excluding 6F structures, and in which the cyclic dianhydride is selected from formulae:

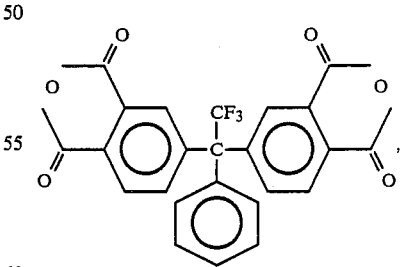

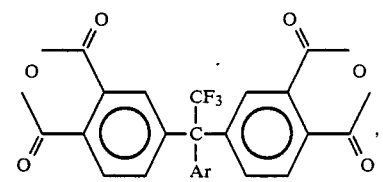

-continued

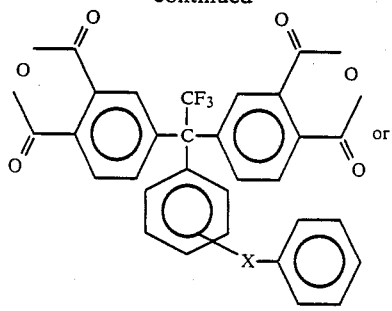 or

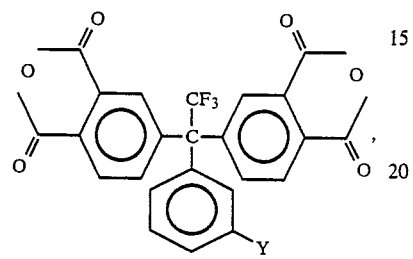, wherein Ar is a polycyclic aromatic hydrocarbon and X is O, S, SO₂, NH, PH, N0, P0, C=O, CH₂ or CH0, and Y is 0-O, 0-S, 0-SO₂, 0-PH, 0₂-P, 0₂N or NO₂, and the diamine is selected from the formulae:

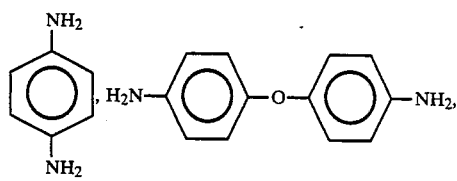

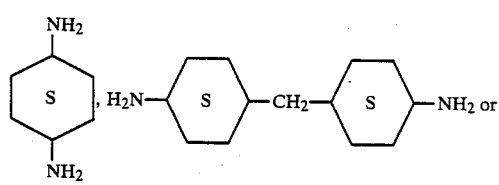

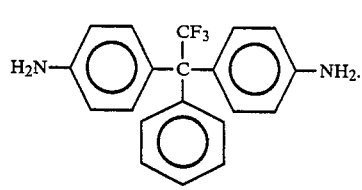

2. The condensation polyimide of claim 1 in which the cyclic dianhydride is

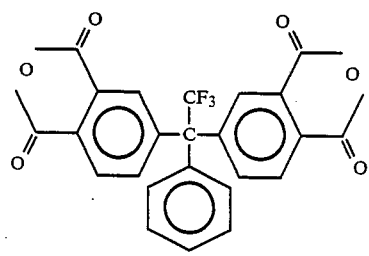

3. The condensation polyimide of claim 2 in which the diamine is

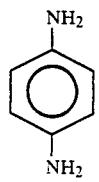

4. The condensation polyimide of claim 2 in which the diamine is

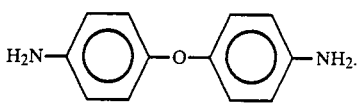

5. The condensation polyimide of claim 2 in which the diamine is

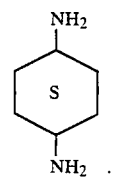

6. The condensation polyimide of claim 2 in which the diamine is

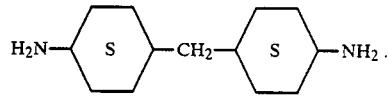

7. The condensation polyimide of claim 2 in which the diamine is

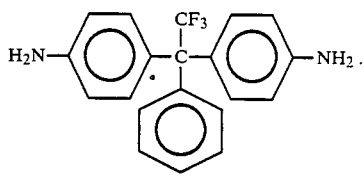

8. A condensation polyimide containing a 1,1,-bis[4-(1,2,-imide)aryl]-1-aryl-2,2,2-trifluoroethane structure comprising a polymerized mixture of a cyclic dianhydride and a diamine, either the dianhydride, the diamine or both containing 3F structures, the final polyimide excluding 6F structures, and in which the cyclic dianhydride is selected from the formulae:

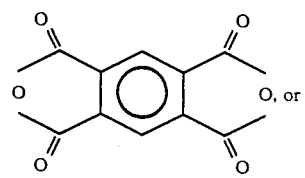 I

-continued
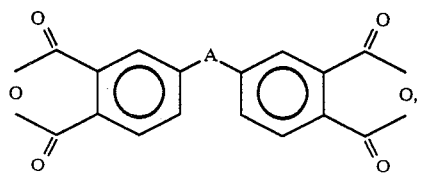
a mixture of
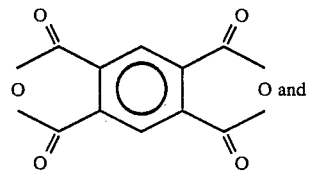 O and
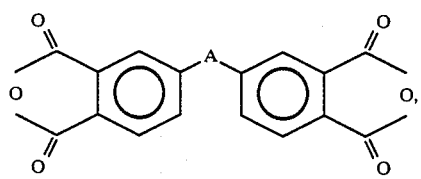,
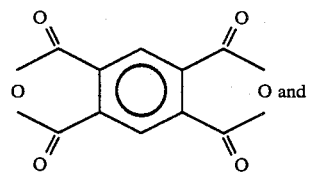 O and
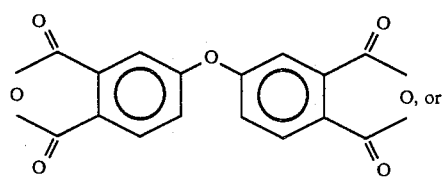 O, or
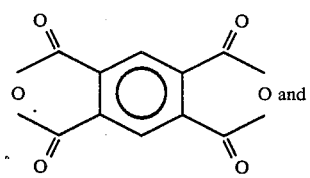 O and
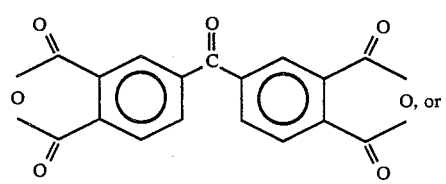 O, or
a mixture of
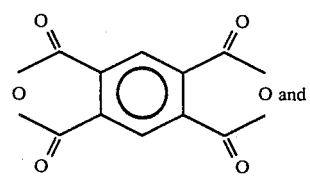 O and
-continued
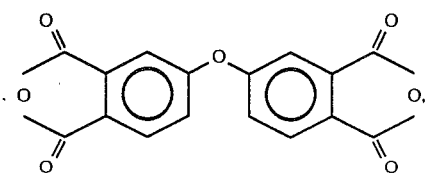 O,  II
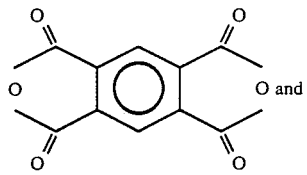 O and
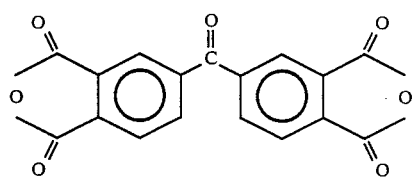
a mixture of
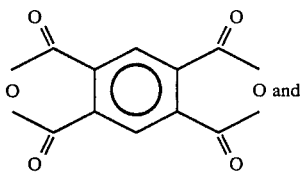 O and    III
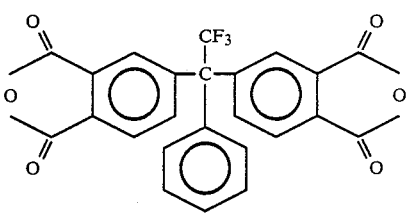    IV
wherein A is O,
or C(CF$_3$)0, and the diamine is selected from the formulae:
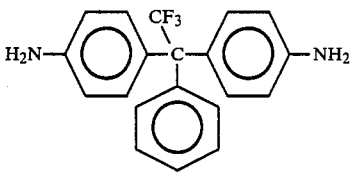   VI
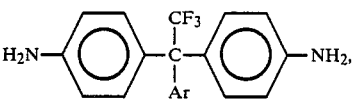

-continued

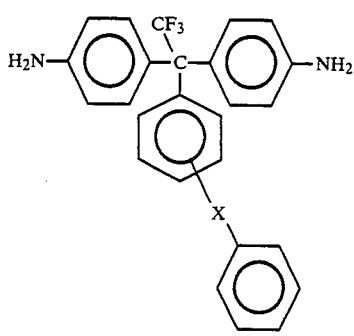

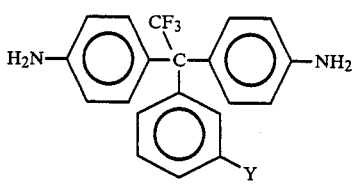

wherein Ar is a polycyclic aromatic hydrocarbon and X is O, S, SO₂, NH, PH, NO, PO, C=O, CH₂ or CHO, and and Y is 0-O, 0-S, 0-SO₂, 0-PH, O₂-P, O₂N or NO₂.

9. The condensation polyimide of claim 8 in which the diamine is

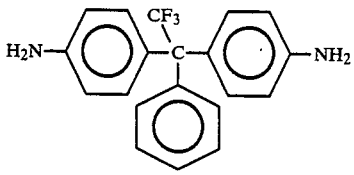

10. The condensation polyimide of claim 9 in which the cyclic dianhydride is

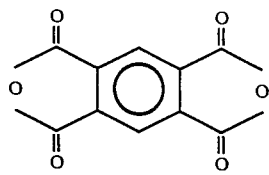

11. The condensation polyimide of claim 9 in which the cyclic dianhydride is

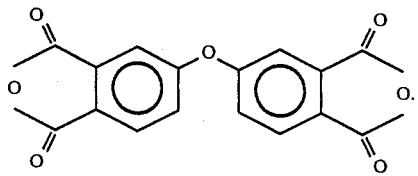

12. The condensation polyimide of claim 9 in which the cyclic dianhydride is

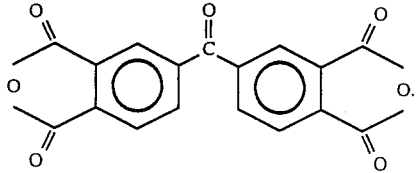

13. The condensation polyimide of claim 9 in which the cyclic anhydride is a mixture of

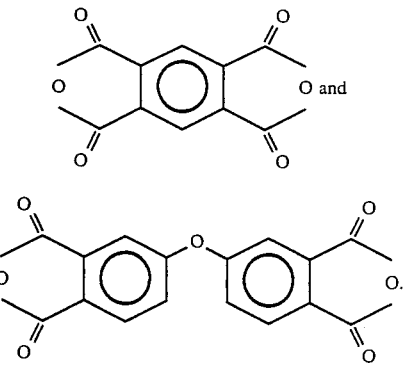

14. The condensation polyimide of claim 9, in which the cyclic dianhydride is a mixture of

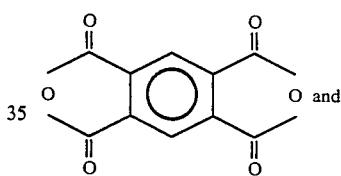

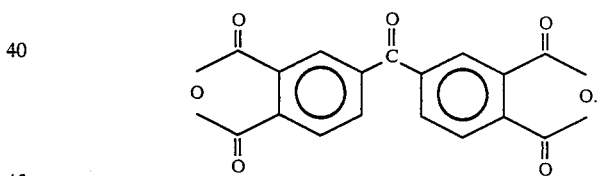

15. The condensation polyimide of claim 9 in which the cyclic dianhydride is a mixture of

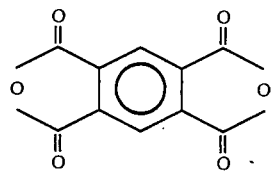

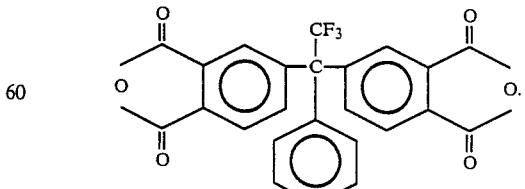

16. A condensation polyimide containing a 1,1,-bis[4-(1,2,-imide)aryl]-1-aryl-2,2,2-trifluoroethane structure comprising a polymerized mixture of a cyclic dianhydride and a diamine, either the dianhydride, the diamine or both containing 3F structures, the final polyimide excluding 6F structures, and in which the cyclic dianhydride is

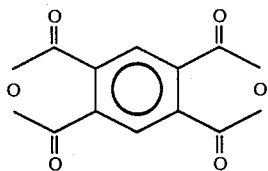

and the diamine is a mixture of

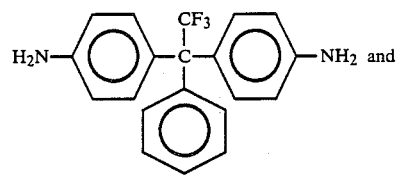

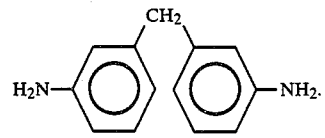

17. A condensation polyimide containing a 1,1,-bis[4-(1,2,-imide)aryl]-1-aryl-2,2,2-trifluoroethane structure comprising a polymerized mixture of a cyclic dianhydride and a diamine, either the dianhydride, the diamine or both containing 3F structures, the final polyimide excluding 6F structures, and in which the cyclic dianhydride is

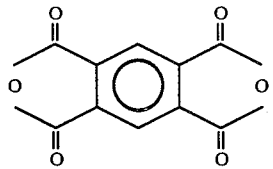

and the diamine is a mixture of

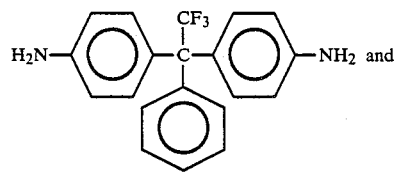

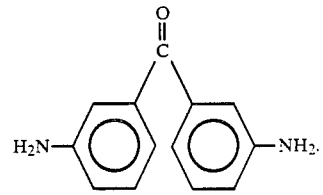

18. The condensation polyimide of claim 8 which comprises

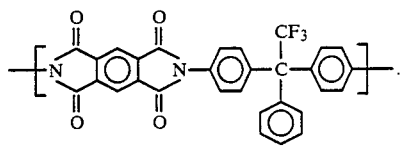

19. The condensation polyimide of claim 8 which comprises

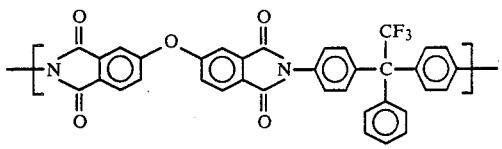

20. The condensation polyimide of claim 8 which comprises

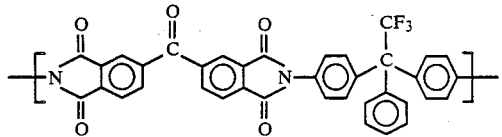

21. The condensation polyimide of claim 8 which comprises

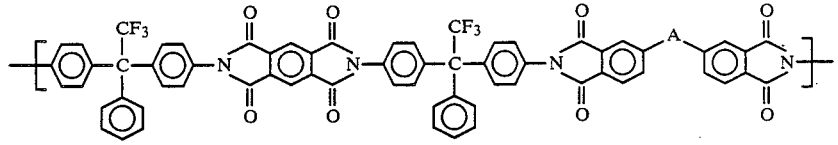

where A = O, C = O, or 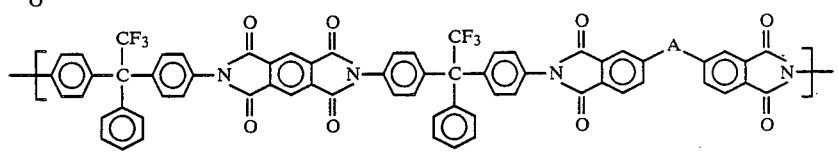

22. The condensation polyimide of claim 8 in which the cyclic dianhydride is (III) and the diamine is

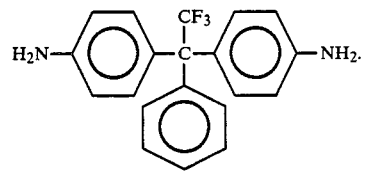

23. The condensation polyimide of claim 8 in which the cyclic dianhydride is (IV) and the diamine is 24. The condensation polyimide of claim 8 in which the cyclic dianhydride is (V) and the diamine is
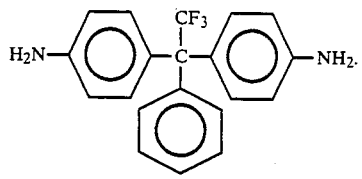
25. The condensation polyimide of claim 8 in which the cyclic dianhydride is (VI) and the diamine is
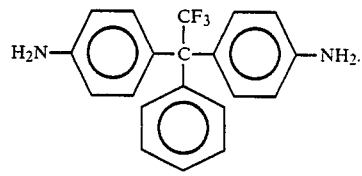
* * * * *